United States Patent [19]

Linehan et al.

[11] Patent Number: 4,772,990

[45] Date of Patent: Sep. 20, 1988

[54] SOLAR POWERED WARNING FLASHER

[75] Inventors: Dave M. Linehan; Victor V. Zaderej, both of Boca Raton; Charles A. Hahs, Jr., Delray Beach, all of Fla.

[73] Assignee: CNI, Boca Raton, Fla.

[21] Appl. No.: 900,607

[22] Filed: Aug. 26, 1986

[51] Int. Cl.⁴ ..................... F21L 11/00; H01L 31/00
[52] U.S. Cl. .................... 362/183; 136/206; 136/291; 340/81 R; 340/114 B; 340/321
[58] Field of Search ...................... 362/183, 190, 194; 340/81 R, 114 B, 321; 136/206, 291

[56] References Cited

U.S. PATENT DOCUMENTS

| | | |
|---|---|---|
| D. 254,658 | 4/1980 | Wagner . |
| 1,477,875 | 12/1923 | Kaplan ................................ 362/194 |
| 2,905,863 | 9/1959 | Martin ................................ 362/84 |
| 3,266,015 | 8/1966 | Pickering et al. . |
| 3,523,290 | 8/1970 | Elledge ............................... 362/194 |
| 3,697,738 | 10/1972 | Decker et al. . |
| 3,818,439 | 6/1974 | Maine . |
| 4,001,778 | 1/1977 | Ross . |
| 4,069,404 | 1/1978 | Minoprio et al. . |
| 4,141,425 | 2/1979 | Treat ................................... 136/291 |
| 4,200,904 | 4/1980 | Doan . |
| 4,281,369 | 7/1981 | Batte . |
| 4,408,264 | 10/1983 | Decker ............ 4,482,941/11001984 |
| 4,482,941 | 11/1984 | Lindner . |
| 4,516,109 | 5/1985 | Thurston . |
| 4,547,761 | 10/1985 | Jones . |
| 4,563,727 | 1/1986 | Curiel . |
| 4,607,207 | 8/1986 | Bruneau ............................. 362/194 |

OTHER PUBLICATIONS

MJR Spec. Sheet, "MJR Introduces . . . ", Rev. 2/26/86.

Primary Examiner—Douglas Hart
Attorney, Agent, or Firm—Jerry A. Miller

[57] ABSTRACT

An improved warning light blinker includes an upper housing member including an integral pedestal extending from an upper surface thereof, the upper housing member being transparent, the upper housing member also including an opening in a lower portion thereof. A lower housing member mates within the upper housing member through the opening. Battery captivating members for captivating a battery so as to substantially eliminate free air from contacting a substantial portion of a battery's outer surface area is provided. A flasher circuit periodically supplies electrical energy to a light bulb. A light dispersing lens is coupled to the pedestal. In the preferred apparatus one or more solar rechargeable batteries are situated within the battery captivating members. The pedestal includes a tapered channel which narrows close to an upper end thereof and a light bulb socket engages in an interference fit near the upper end. The upper housing member includes an upper surface and the upper surface is sloped downward to allow rapid drainage of rain water to enhance the solar efficiency of the solar rechargeable batteries.

19 Claims, 4 Drawing Sheets

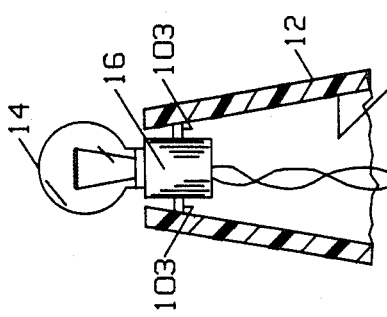
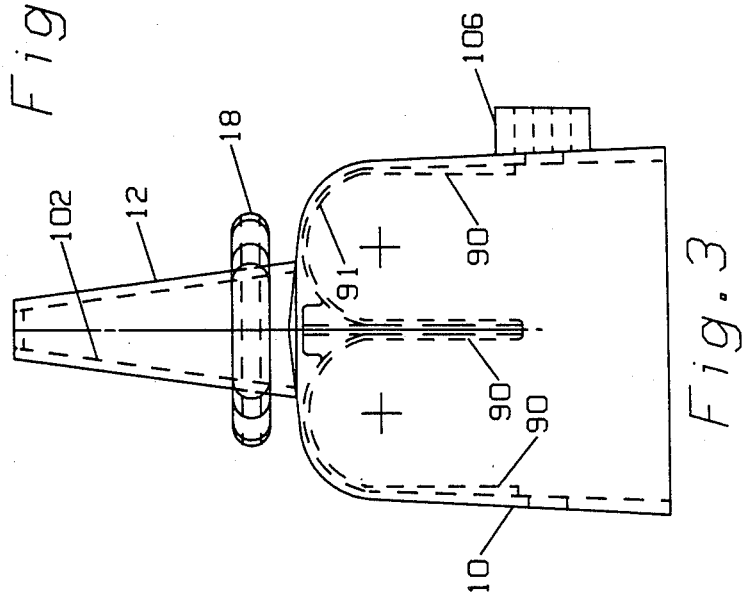
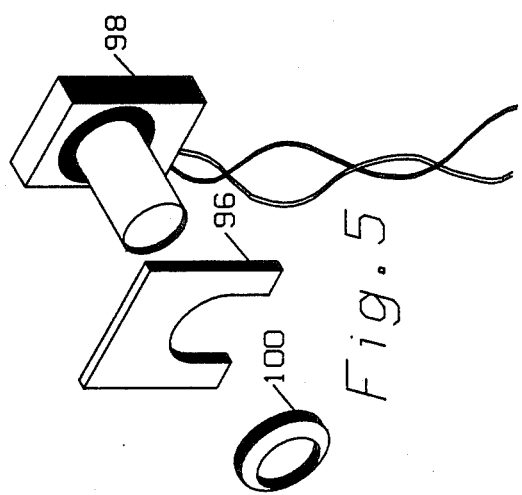
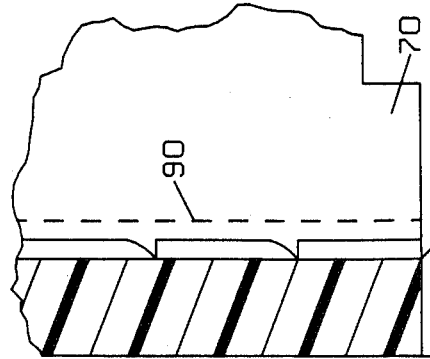
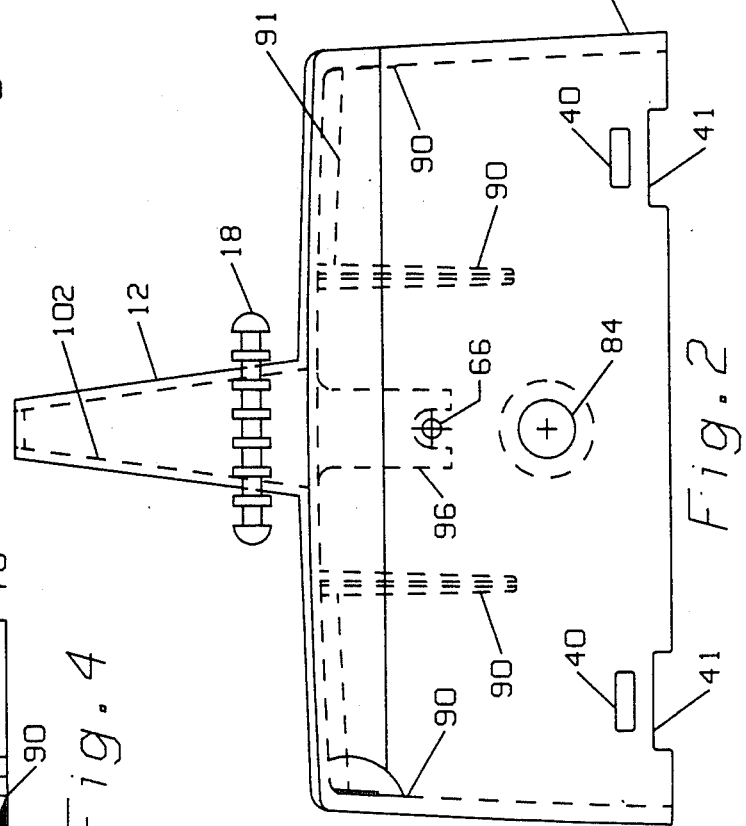

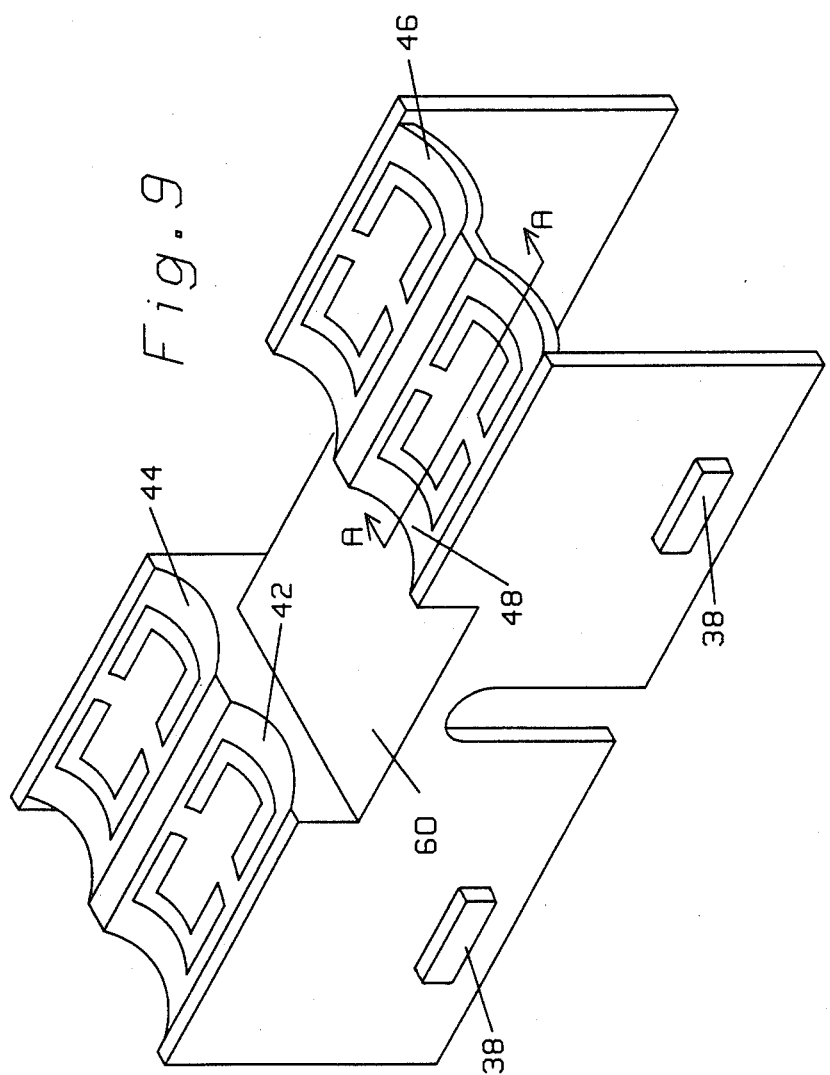
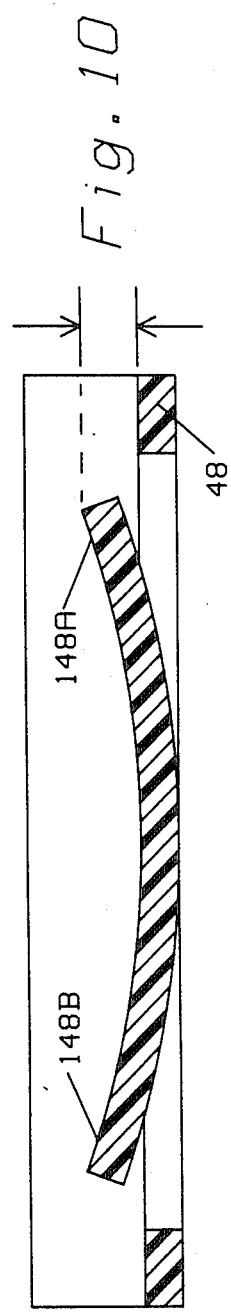

SOLAR POWERED WARNING FLASHER

BACKGROUND OF THE INVENTION

1. Field of the Invention

This invention relates generally to the field of warning flasher lights and the like. More particularly, this invention relates to a solar powered blinker light system which may optionally be powered by conventional flashlight batteries without danger of erroneously recharging batteries which are not designed for recharging.

2. Background

Battery powered warning lights have been in use for some time. Most frequently, such lights are seen attached to road hazard barricades in order to warn motorists of a road hazard such as a road construction site. Examples of such flashers or warning lights are shown in a number of U.S. patents such as U.S. Pat. No. 3,266,015 to Pickering et al. This patent shows a basic warning light which includes upper and lower battery housing members for holding lantern batteries. The upper and lower housing members fit together so that their open sides face each other somewhat like a clam shell without a hinge. The housing may be of snap together design which is attached to a road barricade with a bolt. A lamp is held in the central area of a fresnel lens element by a platform. The light bulb is captivated within a bulb holder which is formed from a separate molded part. This bulb holder assembly further serves to hold the flasher's electronic circuitry.

Variations in this basic design are shown in several U.S. Patents such as U.S. Pat. No. 3,697,738 to Decker et al which shows a version having a quick release feature which allows the more expensive parts of the apparatus to be removed readily to prevent theft. U.S. Pat. No. 4,408,264 to Decker shows another variation which provides resistance to vandalism and includes few housing parts. U.S. Pat. No. 4,482,941 to Lindner shows a barricade light assembly which features a screw-on lens assembly made of two identical members.

Each of the above designs as well as other known conventional designs suffer from high maintenance costs associated with use of so called "lantern batteries" which must be replaced at intervals. Since such lights are frequently used in very large numbers and are frequently located in very remote locations, this maintenance cost can be a very significant factor in their use. Furthermore, such designs are unnecessarily complex to assemble and use excessive numbers of unique parts contributing to relatively high material and labor costs for both fabrication and maintenance. The present invention largely ameliorates these problems as well as others.

U.S. Pat. No. Des. 254,658 shows a solar powered safety blinker light which apparently includes a solar cell array within the lens assembly thereof. Further information is not disclosed about this invention but it is evident that such an assembly is likely to expose sensitive and delicate solar panels to one of the more vulnerable portions of the assembly. Also, the configuration shown may be prone to accumulation of dirt and moisture when exposed to the elements resulting in decreased solar efficiency due to the flat horizontal upper surface of the solar cell array. This flat surface is prone to moisture accumulation which causes scattering of solar radiation.

U.S. Pat. No. 4,563,727 to Curiel relates to a self charging battery cell resembling that used in some embodiments of the present invention. Similar self charging solar batteries are manufactured by MJR Company of Phoenix Arizona and are commercially available as model SN2000 Solar Rechargeable Nickel Cadmium Battery. This patent also discloses several potential uses for such cells including a flashlight having a transparent housing.

The above inventions, however, do not fully address many of the problems which are solved by the present invention which provides a novel arrangement for a solar battery powered warning flasher.

SUMMARY OF THE INVENTION

Accordingly, it is an object of the present invention to provide an improved battery powered warning light which may be powered by either solar rechargeable batteries or by conventional flashlight batteries without danger of charging non-rechargeable batteries.

It is another object of the present invention to provide a warning flasher suitable for use either as a barricade light or as an emergency light.

It is another object of the present invention to provide a warning flasher which requires little or no maintenance.

It is another object of the present invention to simplify maintenance of a warning flasher assembly by simplified bulb replacement and solar battery recharging.

It is another object of the present invention to provide a warning flasher which may be powered by inexpensive D cell batteries.

It is another object of the present invention to provide a low cost warning flasher which is very rugged in construction to readily withstand abusive environments as well as the elements while requiring little maintenance.

It is another object of the present invention to provide a warning flasher which is able to withstand outdoor environmental conditions with minimal degradation of solar efficiency.

It is another object and advantage of the present invention to provide a warning flasher assembly which is easily maintained and which has high visibility due to reflective housing construction.

It is a further object and advantage of the present invention to provide a warning light assembly which is easily assembled and requires very few parts thus reducing tooling, assembly and maintenance costs.

In one embodiment of the present invention an improved warning flasher, includes an upper housing member including an integral pedestal extending from an upper surface thereof, the upper housing member being transparent, the upper housing member also including an opening in a lower portion thereof. A lower housing member mates within the upper housing member through the opening. Battery captivating members for captivating a battery so as to substantially eliminate free air from contacting a substantial portion of a battery's outer surface area is provided. A flasher circuit periodically supplies electrical energy to a light bulb. A light dispersing lens is coupled to the pedestal.

In the preferred apparatus one or more solar rechargeable batteries incorporating internal photovoltaic cells are situated within the battery captivating members. The pedestal includes a tapered channel which narrows close to an upper end thereof and a light bulb socket engages in an interference fit near the upper end. The upper housing member includes an upper surface and the upper surface is sloped downward to allow rapid drainage of rain water to enhance the solar efficiency of the solar rechargeable batteries. Also, a reflective housing is provided for high visibility by molding a reflective texture into a surface of the outer housing member and molding the inner housing member of white plastic.

In another embodiment of the present invention, a high visibility housing for a warning flasher assembly, includes a first housing member made of a substantially transparent material having walls with an outer surface. A second housing member is attached to the first housing member so as to form an enclosure. A dispersive lens assembly is coupled to the first housing member for dispersing light produced from within the lens assembly in a manner which enhances visibility. A light reflective texturing is disposed on the walls so that light reflection from the outer surface is enhanced.

These and other objects, features, and advantages of the invention will become apparent to those skilled in the art upon consideration of the following detailed description taken in conjunction with the accompanying drawings.

BRIEF DESCRIPTION OF THE DRAWINGS

FIG. 2 is a side view of the upper housing member of the present invention.

FIG. 3 is a front view of the upper housing member of the present invention.

FIG. 4 is a detail partial cross section of the battery contact/housing interface of the present invention.

FIG. 5 is a detail view of the switch assembly of one embodiment of the present invention.

FIG. 6 is a view of the bulb/pedestal assembly of the present invention shown in partial cross section.

FIG. 9 is an isometric view of an alternative lower housing member for the present invention.

FIG. 10 is a cutaway view of section A—A of FIG. 9.

DETAILED DESCRIPTION OF THE INVENTION

Figure 1:
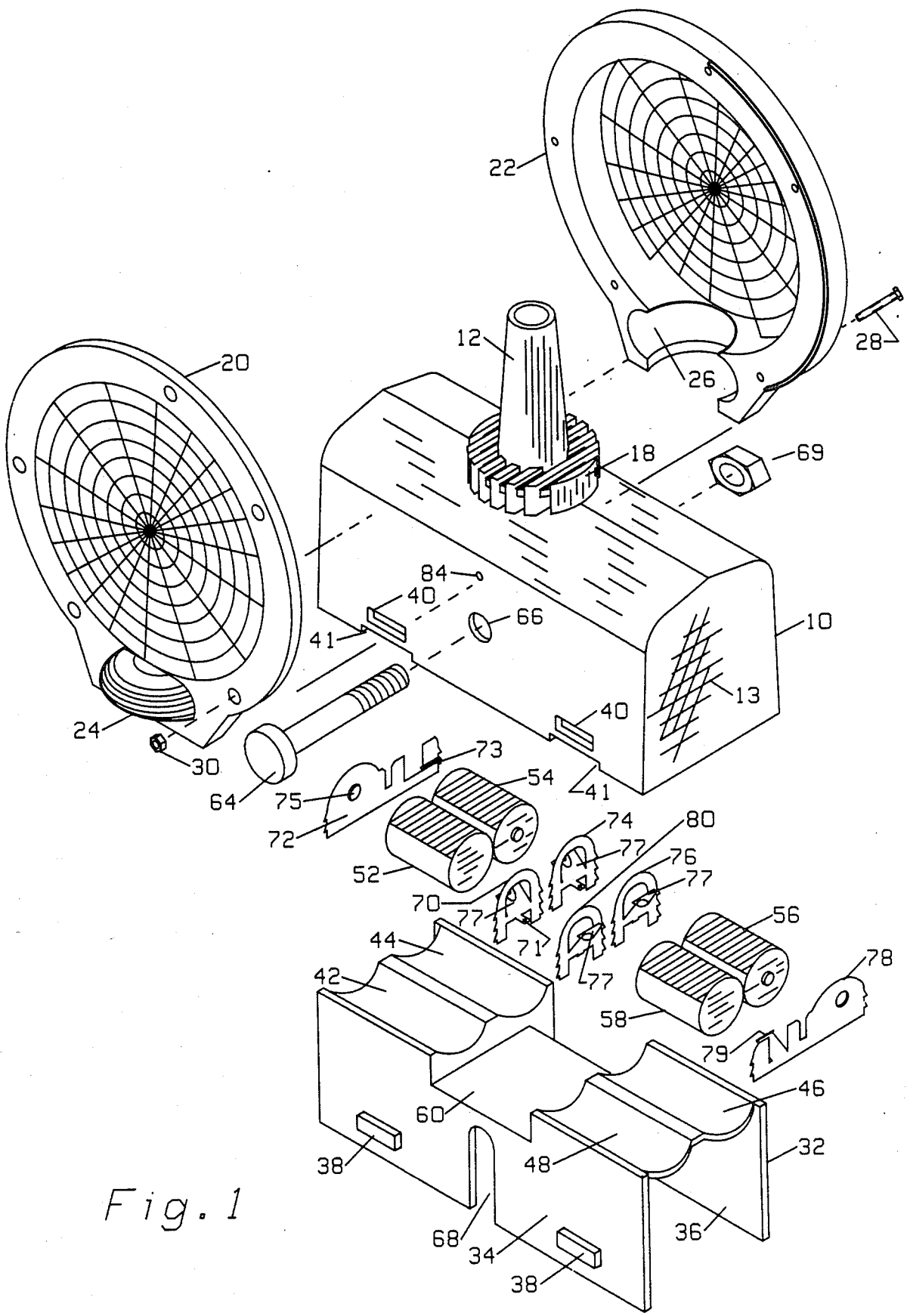
FIG. 1 is an exploded isometric view of the major components of the present invention.

Turning now to the drawings wherein like reference numerals designate identical or corresponding parts throughout the several views, and more particularly to FIG. 1 thereof, there is shown an isometric view of the warning flasher of the present invention including most of the major nechanical components. An upper housing member 10 includes a pedestal 12 mounted to a central area of its upper surface to support a light bulb 14 mounted within a socket 16 as will be described in conjunction with the description of FIG. 6 later.

The pedestal 12 is preferably molded as an integral part of upper housing member 10 which is preferably made of clear plastic such as clear polycarbonate. The pedestal 12 is somewhat conical in shape with a conical channel extending through the central portion thereof. Near the lower (widest) end of the pedestal is an enlarged neck 18 which is preferably slotted generously to allow for even cooling of the mold and conservation of housing material.

The upper housing member 10 and pedestal 12 are preferably molded as a single part from a clear plastic such as General Electric Lexan (TM) 920 or 940 but this is not to be limiting. The upper housing member and pedestal may also be made of transparent or opaque material if solar batteries are not to be used. Preferably the material is injection moldable and highly stable in the presence of ultraviolet light so that discoloring and reduction of clarity will be minimal. It is also desirable that they be made of a durable material having a reasonable cost. The preferred material allows at least approximately 90 to 95% of the sun's energy to pass through the housing. The sides of the upper housing member may be molded with a refractive texture 13 to provide a degree of reflectiveness to make the flasher even more visible if desired. This refractive texture provides reflection of approaching headlights to enhance the visibility of road hazard warnings. Those skilled in the art will appreciate how to accomplish such texturing.

A dispersive fresnel lens assembly made of mating halves 20 and 22 which are essentially identical in the preferred embodiment includes collar portions 24 and 26 respectively which mate with neck 18 to firmly attach the lens assembly to the upper housing member. The lens assembly is secured in place by screws such as 28 and nuts such as 30 as shown to complete the lens assembly. In this embodiment, five such screws and nuts are used but this is not to be limiting. The lens assembly is similar to that of conventional warning flashers as described in the aforementioned patents.

A flasher circuit (not shown) such as those available from HSD Services Propriety LTD, Eltham Victoria, Austrailia which includes an internal light detector is mounted within upper housing member 10 in any suitable manner so that light may be directed to the light detector through the clear upper housing. Positioning within the pedestal itself is not required as in the prior art. Since the housing is clear, flasher circuit may also be simply suspended from it's wires thereby further simplifying assembly. Positioning of the circuit is not critical and the circuit may be placed within the pedestal itself if desired. The flasher circuit's light detector determines when the ambient light conditions have dropped below a predetermined threshold so that the flasher may begin flashing when the ambient light is low. This automatically starts the flashing action when night falls.

A lower housing member 32 is molded of plastic which may be either clear plastic such as polycarbonate or may alternatively be made of an inexpensive plastic such as colored ABS plastic but of course these material selections are not to be limiting as other suitable materials may be substituted. If the lower housing member is made of colored plastic, the color of the warning light may be largely changed by use of a different colored lower housing member. In the preferred embodiment, the inner housing member is made of white plastic to enhance the visibility and reflectiveness of the housing assembly.

Lower housing member 32 includes walls 34 and 36 each including protrusions 38 which are appropriately dimensioned to mate within apertures 40 of upper housing member 10. The protrusions 38 are situated near the lower edge of walls 34 and 36 so that when lower housing member 32 is inserted inside upper housing member 10 an adequate lever arm from the upper portion of lower housing member is provided thereby allowing the resilient plastic to snap into place with protrusions 38 mating securely within apertures 40. The lower housing member and the upper housing member mate together in a manner resembling the stacking of cups or the like. That is, the open ends of each of the housing members both face the same direction when assembled. This allows for easy drainage of any water which may find it's way inside the assembly such as by condensation. The upper housing member is provided with cutouts 41 situated at the lower edges of the upper housing member 10 and preferably directly below apertures 40 to allow easy disassembly. To disassemble the mating upper and lower housing members, the user places his or her fingers in the cutouts 41 and squeezes the walls 34 and 36 together releasing the protrusions 38 from the apertures 40 and allowing the lower housing member 32 to slide out of engagement with the upper housing member 10.

The upper portion of lower housing member 32 includes four semicircular troughs or beds 42, 44, 46 and 48 for cradling four D size batteries 52, 54, 56 and 58 respectively in the preferred embodiment. Between trough pairs 42-44 and 46-48 lies a platform 60 which is depressed lower than the beds to allow room for electrical components between the upper and lower housing members. In the preferred embodiment, troughs 42-48 are slightly smaller in curvature than the radius of the batteries so that an interference fit is created when assembled. Similar curved surfaces 91 are formed in the inner surfaces of the upper housing member as will be apparent later. By providing such tight interference fits with the batteries, condensation of the surfaces of the batteries is inhibited since there is little or no air trapped between the batteries and the housing members pocket. This is especially important in the present invention since the upper housing member is preferably clear thereby allowing sun light to enter the housing creating a greenhouse effect.

As further protection against condensation, the lower housing member 32 mates within the upper housing member 10, as described above, so that any condensation which does occur within the housing may readily drain out. Also, the structure, by virtue of not being airtight, allows the internal housing to breathe so that condensation is less likely.

As shown in FIG. 1, the batteries may be solar rechargeable batteries such as the MJR Company's model SN2000 D size battery. These batteries incorporate internal photovoltaic solar cells which charge the batteries during daylight hours. By using batteries which incorporate solar cells, ordinary alkaline or carbon batteries may be readily substituted if desired without danger of the batteries being damaged by charging. This may be advantageous in situations where the lights are in danger of theft or vandalism so that it is undesirable to use more expensive solar rechargeable batteries. Further, since all known warning flashers of this type use less common lantern batteries, the present invention may be more readily provided with standard D size replacement batteries without need for stocking large quantities of less common lantern batteries. This also allows use of the present invention as a substitute for road flares which are sometimes used to signal a motorist in trouble.

Theft of the above assembly is inhibited by use of a so-called "tamper proof bolt" 64, many variations of which are commercially available in various forms, to attach the flasher to a road barricade (not shown) or other structure as desired. Bolt 64 passes through a hole 66 in each side of upper housing member 10 as well as a slot (or alternately a hole) 68 within lower housing member 68. Bolt 64 mates with a nut 69 which is captivated within the upper housing member as will be described later. Bolt 64 thereby also securely locks the upper and lower housing members together to further inhibit tampering.

The batteries 52 through 58 are connected in series to provide a four cell array having terminal voltage between approximately 4.8 volts and approximately 6.0 volts depending upon the type of cells used. The light bulb rating should be selected accordingly with the common 1850 series bulb being a suitable bulb for most applications. When nickel cadmium cells are used a bulb rated approximately at 4.0 volts with a similar power rating as the 1850 bulb should provide similar light output. In the preferred embodiment, the flasher operates the light bulb at an approximate 10% duty cycle allowing for very long battery life and good flasher visibility.

Battery 52's negative terminal is connected to a spring contact 70 and it's positive terminal is connected to a spring contact 72. Contact 70 forms the negative terminal of the four battery array. Contact 70 includes an electrical connector spade 71 which may be connected to with a suitable space clip wire connector or may alternatively be soldered to a wire. Contact 70 includes a spring finger 77 which is used to provide electrical connection to the battery near the battery's upper edge (not in the center) in the preferred embodiment.

The spring finger includes a slight bend approximately 6 mm above the center line of the battery. The spring finger also includes a small dimple about 3 mm in radius located at the center line of the battery. This dimple may be used to contact the positive electrode of the battery terminal while the slight bend at the upper end of the lever arm forms the point of contact for the negative electrode of the battery. This allows the same battery contact to be used for both positive and negative electrodes by allowing the nipple-like positive electrode to suitably mate with the lower portion of spring finger 77 at the location of the dimple.

The negative terminal of battery 54 is connected to the springing negative contact 73 of spring contact 72. Spring contact 72 preferably includes a spring negative contact 73 and a dimple-like positive contact 75. The positive terminal of battery 54 is connected to a contact 74 which is connected by a wire (not shown) to a spring contact 76. Contact 76 is connected to the negative terminal of battery 56 and the positive terminal of 56 is connected to a spring contact 78. Contact 78 also contacts the negative terminal of battery 58 at its spring finger 79 and the positive terminal of 58 is connected to a contact 80 which forms the positive terminal of the battery array. Spring contacts 72 and 78 are affixed to contact carriers located at the inner surface of the upper housing member 10 in a manner which will be more clearly understood later in considering FIG. 4. Spring contacts 70, 74, 76 and 80 are similarly attached to the inner surface of housing member 32 at terminal carriers molded as part of the upper housing member as will be described later. Spring contacts 72 and 78 are essentially identical and include separate spring finger elements and dimples as shown in FIG. 1.

Spring contacts 70, 72, 74, 76, 78 and 80 are each fabricated from stainless steel or other suitable non-corrosive material. Each of the spring contacts includes a spring member 73, 77 and 79 respectively to engage electrical contact with the negative terminal of their respective batteries. These spring members also serve to urge the batteries into electrical engagement at their positive terminals. Contacts 72 and 78 are essentially identical as are contacts 70, 74, 76 and 80 thus reducing the total number of unique parts required to allow higher volume manufacture and lower cost as well as ease of assembly.

Upper housing member 10 also includes a small aperture 84 for access to an internal power switch using a small tool so that the flasher may be actuated only by someone possessing an appropriate tool. In an alternative embodiment, the mold for upper housing member may be fitted with a larger slug for forming aperture 84 so that the power switch may be mounted directly to the upper housing member 10 thereby obviating the need for a tool for actuating the flasher.

Such embodiments may be useful to allow the present flasher to be used for other uses besides construction barricades. For example, the present flasher can be carried compactly in an emergency vehicle to mark the scene of an accident. Or, it may be carried in the trunk of an automobile in place of flares for use in signaling automobile trouble. Other forms of lens assemblies may be desirable in such uses to distinguish the flasher in color or shape, etc. from those used to mark road construction. In another similar embodiment, the switch may be mounted in the aperture 66 which normally would accommodate bolt 64 (which is unnecessary in some environments). Also, by virtue of using D cell batteries, the present invention can be more economical for such uses for police and fire departments due to large volume purchasing of such batteries for other purposes.

In some embodiments it may be desirable to provide charging terminals to the housing (not shown) so that battery charging can be effected by either solar power or by more conventional nickel cadmium battery chargers powered by alternating current or by an automobile. Of course, if such terminals are provided, care should be taken to assure that only chargeable batteries are installed in the unit and charged.

Turning now to FIG. 2, a side view of the upper housing member 10 showing the internal structures in broken lines is shown. FIG. 3 should be viewed simultaneously with FIG. 2 in order to gain a full appreciation of the internal structure. Extending downward from each side of the pedestal 12 and at the ends of the housing member 10 on the inner surface of the upper housing member is a plurality of contact mounts 90. Each contact mount 90 includes a small channel for receiving the edges of the spring contact members as shown more clearly in FIG. 4. FIG. 4 is a cutaway view of the contact mount and contact 70 (for example) taken along the plane of the contact mount's major surface. The contact 70 is engaged in the channel by sliding the spring contact 70 into the channel. Each of the spring contacts are provided with tooth-like serrations which dig into the plastic sides of the channels thereby resisting removal. Those skilled in the art will appreciate that the spring contacts may also be heat staked or riveted or otherwise appropriately attached to contact mounts without departing from the present invention.

Also molded within the upper housing member 10 is a switch mount 96 through which in FIG. 5 a push-on/push-off switch 98 is shown to be mounted via a nut 100. This allows the flasher to be cut off or on by depressing the switch 98 through aperture 66 using a suitable small tool.

Turning briefly to FIG. 6, the light bulb 14 and socket 16 are mounted within the transparent pedestal 12 as follows. The pedestal is provided with a tapered channel 102 which engages by an interference fit the socket 16 at tabs 103 when the socket is pushed upward through the somewhat conical channel from the bottom with a small tool such as a pencil or screwdriver or other appropriate tool. The socket is provided with small tabs, bumps or other suitable structures which increase it's outer diameter greater than that of the inner diameter of the channel near the upper surface. Also, the wires are preferably reasonably stiff and securely attached to the socket 16 to allow further support for the socket. The upper opening of the pedestal channel is large enough to pass the bulb but not the socket with it's tabs in the preferred embodiment.

To retrieve the assembly the wires attached to the socket are tugged to release the interference fit. The socket may also be provided with a cord for retrieval. When the light bulb is burned out, the present assembly allows for simplified replacement thus simplifying maintenance. Since the pedestal is made of clear plastic by virtue of being molded as an integral part of the upper housing member 10, the channel 102 need not be of high tolerance since light will pass to the lens even if the light bulb does not fully extend beyond the upper tip of the pedestal. In fact, the upper tip of the pedestal need not even communicate with the channel if desired. When standard D cells are used, this can be a significant advantage since the most common cause of failure is the depletion of the batteries. Thus, if replacement of the batteries does not restore operation, the light bulb may be readily replaced without further disassembly.

Returning now to FIG. 2 and FIG. 3, the upper surface of upper housing member 10 is sloped downward to allow rain to wash off of the upper housing member easily thereby washing off the housing and avoiding accumulation of water and debris which tends to attenuate ultraviolet and visible light transmission. This serves to inhibit degradation of the solar efficiency of the housing to allow maximal charging of solar batteries to take place. Also, it allows the sun to heat the batteries readily to help avoid problems associated with charging nickel cadmium batteries in low temperatures. The sides of the lower housing member may be textured to provide a somewhat translucent or reflective appearance if desired to obscure the inner components from view and/or enhance reflectiveness while allowing the upper housing member to be molded from clear plastic to achieve the desired solar transparency at it's upper surface adjacent the battery's solar cells.

At the rear of upper housing member 10 is a small structure 106 which is generally cylindrical on the outer surface and generally hexagonal on the inner surface to accommodate nut 69. Since the tolerance of the outer diameter of nut 69 may vary considerably, the structure 106 is provided with a draft or narrowing of the inner dimensions as it approaches the housing wall so as to accommodate nuts 69 throughout the range of tolerance. This securely captivates the nut within the structure 106 to help ensure that the housing is not tampered with.

Figure 7:
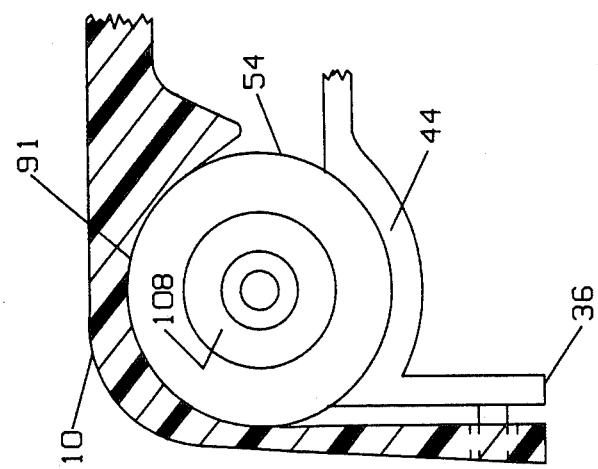
FIG. 7 is a cross sectional view of the battery compartment including batteries.

Turning now to FIG. 7, a partial crosssectional view of the battery 54 (for example) captivated between curved inner surface 91 of upper housing member 10 and the trough 44 of lower housing member 36 is shown. The battery 54 is captivated tightly between curved inner surface 91 and trough 44. This substantially eliminates any free air space between the inner surface 91 and the battery. When solar rechargeable batteries are used, this tight fit inhibits the formation of condensation which would reduce the transmission of solar energy to the solar cells.

If solar rechargeable batteries are used, it is most efficient for charging if the solar cell array is facing upwards at all times so that maximum sunlight reaches the solar cells. As such, a mechanism to hold the batteries in the preferred position may be desirable, but this is not to be limiting as the batteries are tightly captivated in the preferred embodiment. If such a mechanism is desired, it may be readily accomplished by installing a small doughnut shaped piece of double sided foam tape 108 to the positive battery contact surrounding the nipple-like positive electrode. Those skilled in the art will recognize that other techniques may similarly be used without departing from the present invention.

Figure 8:
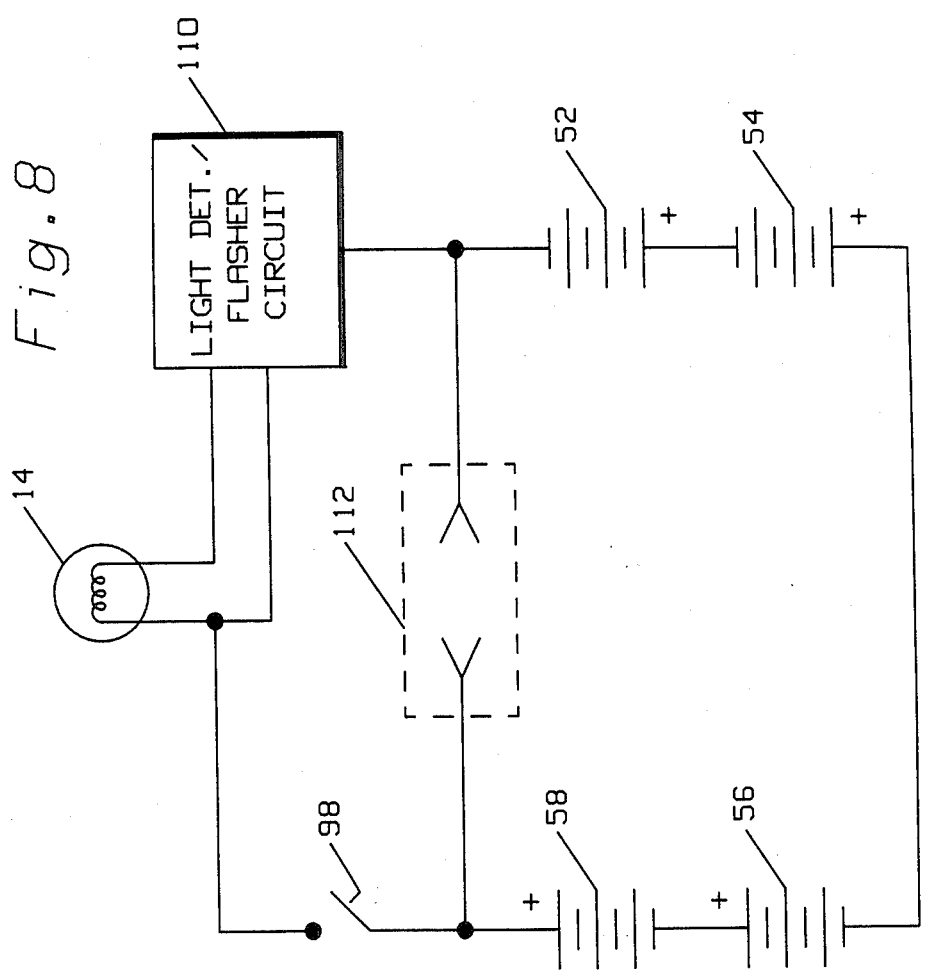
FIG. 8 is a schematic diagram of the circuitry of the present invention.

Turning now to FIG. 8, a schematic diagram of the circuitry of the present invention is shown. Light bulb 14 is connected across the two load terminals of a flasher circuit 110. The negative terminal of battery 52 is connected to the third terminal of circuit 115. One terminal of switch 98 is connected to the supply terminal of flasher circuit 110. The other terminal of switch 98 is coupled to the positive terminal of battery 58. Batteries 52, 54, 56 and 58 are all connected in series to form a 4.8-6.0 volt battery array for supplying the power to the flasher circuit 110 and light bulb 14.

Turning now to FIG. 9, an alternative embodiment of lower housing member 32 is shown. In this embodiment, beds 42, 44, 46 and 48 further include spring members 142A, 142B; 144A, 144B; 146A, 146B; and 148A, 148B. These spring members are formed from the inner portion of horseshoe shaped cutouts which are molded into the plastic lower housing member 32 and serve to urge the batteries into firm engagement with the curved inner surface of upper housing member 10. Of course the shape of the cutout is not to be limiting. This forces the upper side of the solar chargeable batteries into a tight fit allowing minimal trapping of air between the battery's upper surface and the upper housing member 10. The spring members are seen more clearly in FIG. 10 which is a cutaway view taken along lines A—A of FIG. 9. The dimension indicated by the arrows of FIG. 10 is preferably approximately 2mm but this is not to be limiting. The springing action is provided by the resiliency of the plastic of housing member 32. Those skilled in the art will recognize other equivalent techniques for forcing an absence of free air from at least the upper surface of the batteries.

Although not shown, it will be appreciated that batteries 52, 54, 56 and 58 may include solar cells as well as a diode to effect charging of the battery cells. It may also optionally be desirable to provide charging terminals 112 across the battery cell array to allow for initial charging of the batteries or to provide alternate forms of charging for prolonged periods of overcast weather. Such charging terminals also allow the present invention to be used with conventional rechargeable batteries without need for disassembly of the housing to effect recharging.

The above design eliminates at least two of the plastic molded parts used in many popular designs of such flashers thus reducing tooling costs and manufacturing costs. Also, by virtue of the clear upper housing member, installation of the electronic flasher and light sensor circuits are less critical and more easily effected. The battery contacts are stamped metal parts eliminating undesirable coil spring contacts which are common. Also the battery contacts are designed so that the same parts may be used for contacts 70, 74, 76 and 80, in addition to the contacts 72 and 78, further reducing the number of unique parts needed.

It will be appreciated by those skilled in the art that the present invention may be readily modified for substantially higher light output if desired by suitably enlarging the battery housing components to accept six or eight batteries. Of course, different flasher and light bulbs may also be required for such applications.

The convenience and versatility of the current design allows the design to be used in numerous applications. When the housing is formed from transparent material to allow use of solar batteries, the invention is well suited for use as a barricade light in remote locations which are difficult to service. Adaptations may also be suitable for marine applications. It may be substituted for flares and other emergency lights to signify automobile accidents or breakdowns by police, firemen and motorists.

The use of D size batteries allows for size reduction over the long time standard lantern batteries and provides economic advantages to large current users of D cell batteries such as police departments, etc. Of course, the present invention may also be implemented similarly with C size or other standard batteries without departing from the present invention. Also, those skilled in the art will recognize that many variations exist for modifying the physical arrangement of the batteries; for example, rotating the batteries 90 degrees. These modifications fall within the scope of the present invention.

According to the preferred embodiment, solar chargeable batteries are used to provide a virtually maintenance free warning flasher which may be used in environments which are beyond the scope of the uses contemplated for conventional flashers. The design allows for good performance in harsh environments with minimal solar efficiency degradation. In addition, the number of unique parts are reduced below that which is normal in the art, allowing for simplified and inexpensive manufacture while reducing the cost of stocking a large variety of replacement parts.

THUS, it is apparent that in accordance with the present invention, a method and apparatus that fully satisfies the aims, advantages and objectives is set forth above. While the invention has been described in conjunction with specific embodiments, it is evident that many alterations, variations and modifications will become apparent to those skilled in the art in light of the foregoing description. Accordingly, it is intended that the present invention embrace all such alternatives, modifications and variations as fall within the spirit and broad scope of the appended claims.

What is claimed as new and desired to be secured by Letters Patent of the United States is:

1. An improved warning flasher assembly, comprising in combination:
    an upper housing member including an integral pedestal extending from an upper surface thereof, said upper housing member being made of a material which passes light, said upper housing member including an opening in a lower portion thereof;

a lower housing member mating within said upper housing member through said opening;

battery captivating means for captivating a battery, said battery having an upper surface when placed within said battery captivating means in a normal operating orientation, said battery captivating means firmly contacting said upper surface so as to substantially eliminate free air from contacting a major portion of the battery's upper surface area; and a flasher circuit for periodically supplying electrical energy to a light bulb.

2. The apparatus of claim 1, further including a light dispersing lens coupled to said pedestal.

3. The apparatus of claim 1, further comprising one or more solar rechargeable batteries situated within said battery captivating means.

4. The apparatus of claim 1, further comprising a solar cell within said upper housing and capable of receiving light therethrough and one or more rechargeable batteries coupled to said solar cell for receiving charging current therefrom.

5. The apparatus of claim 1, wherein said pedestal includes a tapered channel which narrows close to an upper end thereof and further including a light bulb socket engaged in an interference fit near said upper end.

6. The apparatus of claim 1, wherein said upper housing member includes an upper surface and wherein said upper surface is sloped downward to allow rapid drainage of rain water.

7. The apparatus of claim 1, wherein said upper housing member includes a textured surface.

8. The apparatus of claim 1, further comprising means for attaching said upper and lower housing members to a road construction barricade.

9. The apparatus of claim 1, further including means for charging batteries within said upper and lower housing means without separating said upper and lower housing means.

10. The apparatus of claim 1, wherein said pedestal is made of a material which passes light.

11. The apparatus of claim 10, wherein said material is transparent.

12. The apparatus of claim 10, wherein said material is translucent.

13. The apparatus of claim 1, further comprising a lens assembly attached to said pedestal.

14. The apparatus of claim 1, further comprising means for allowing condensation to escape from between said upper and lower housing members.

15. An improved warning flasher, comprising in combination:

an upper housing member including an integral pedestal extending from an upper surface thereof, said upper housing member being transparent with a reflective texturing molded into sides thereof, said upper housing member including an opening in a lower portion thereof;

a lower housing member mating within said upper housing member through said opening;

battery captivating means for captivating a battery so as to substantially eliminate free air from contacting a substantial portion of a battery's outer surface area;

a flasher circuit for periodically supplying electrical energy to a light bulb;

a light dispersing lens coupled to said pedestal;

one or more solar rechargeable batteries situated within said battery captivating means;

said pedestal including a tapered channel which narrows close to an upper end thereof and further including a light bulb socket engaged in an interference fit near said upper end; and said upper housing member including an upper surface and wherein said upper surface is sloped downward to allow rapid drainage of rain water.

16. A high visibility housing for a warning flasher assembly, comprising in combination:

a first housing member made of a substantially transparent material having walls with an outer surface;

a second housing member attached to said first housing member so as to form an enclosure;

a dispersive lens assembly, coupled to said first housing member, for dispersing light produced from within said lens assembly in a manner which enhances visibility;

a light reflective texture disposed on said walls so that light reflection from said outer surface is enhanced; and wherein said second housing member fits substantially within said first housing member, and wherein said second housing member is made of a material having high light reflectivity.

17. The apparatus of claim 16, wherein said second housing member is made of white material.

18. The apparatus of claim 16, wherein said first housing member includes a curved upper surface to allow for drainage of rain water.

19. A housing apparatus for enclosing an apparatus powered by a solar battery, said solar battery incorporating an integral solar cell on a charging surface thereof, comprising in combination:

enclosure means for enclosing said solar battery powered apparatus, said enclosure means being made of a material which passes light; and battery captivating means for captivating said solar battery, said battery captivating means firmly contacting said charging surface of said solar battery so as to substantially eliminate free air from contacting a major portion of the battery's charging surface;

whereby condensation on said battery's charging surface is inhibited.

* * * * *